Jan. 19, 1965 H. O. SHAW 3,166,146
SAFETY BELT IGNITION CUTOUT SWITCH
Filed May 14, 1963 2 Sheets-Sheet 1

INVENTOR.
HAROLD O. SHAW,
BY
McMorrow, Berman & Davidson
ATTORNEYS.

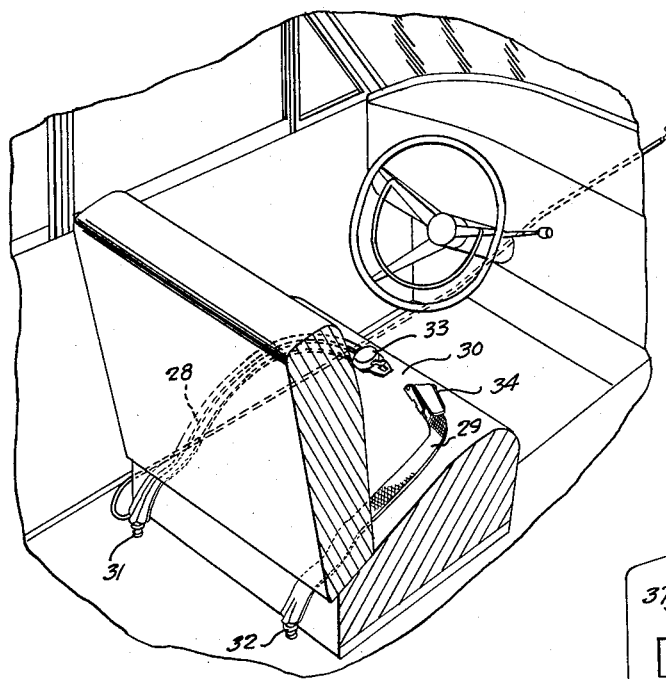
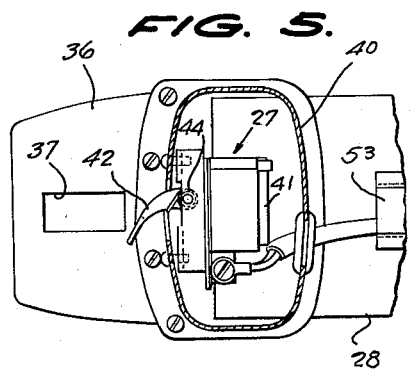
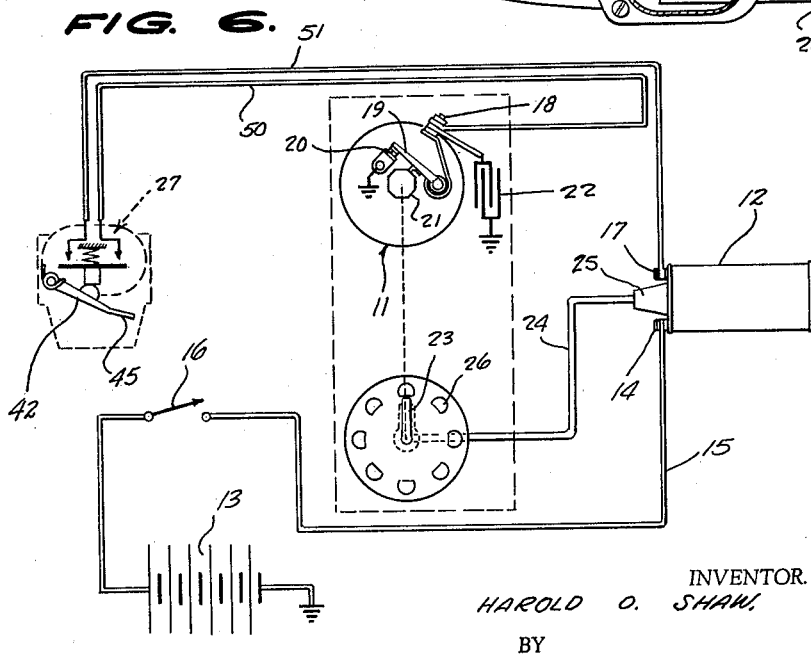

United States Patent Office 3,166,146
Patented Jan. 19, 1965

---

3,166,146
SAFETY BELT IGNITION CUTOUT SWITCH
Harold O. Shaw, 1309 Muncie Pike, Jonesboro, Ind.
Filed May 14, 1963, Ser. No. 280,325
1 Claim. (Cl. 180—82)

This invention relates to motor vehicle safety devices, and more particularly to an ignition circuit arrangement including an ignition cutout switch controlled by the condition of a vehicle safety belt.

The main object of the invention is to provide a novel and improved safety device for a motor vehicle wherein the ignition circuit of the vehicle will be open unless the operator fastens his safety belt, the system involving relatively simple parts, being easy to install, and providing assurance that the vehicle operator properly fastens his safety belt before placing the vehicle in motion.

A further object of the invention is to provide an improved safety system for a motor vehicle equipped with one or more safety belts, the system controlling the ignition circuit of the vehicle so that the ignition circuit cannot be energized unless the operator's safety belt is properly fastened, the system involving inexpensive components, being reliable in operation, and involving relatively compact and inconspicuous components.

Further objects and advantages of the invention will become apparent from the following description and claim, and from the accompanying drawings, wherein:

FIGURE 4 is a fragmentary perspective view, partly in cross section, showing a portion of a motor vehicle seat equipped with safety belt members such as those illustrated in FIGURES 1 to 3, with the buckle elements associated with the belt segments separated.

FIGURE 5 is an enlarged cross sectional view taken substantially on the line 5—5 of FIGURE 2.

FIGURE 6 is a wiring diagram showing the electrical connections of a motor vehicle safety system employing a safety belt-controlled ignition switch, in accordance with the present invention.

Figure 1:
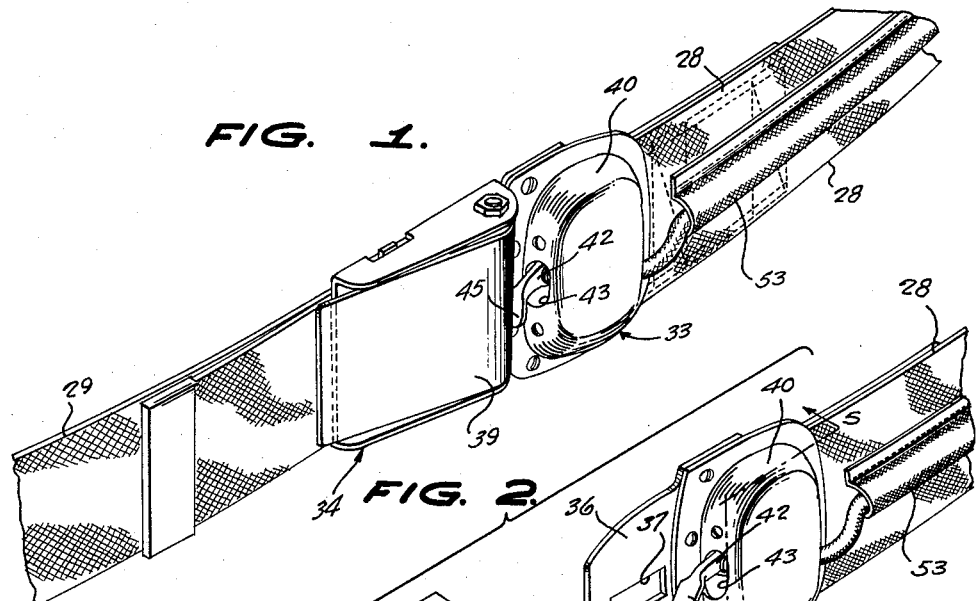
FIGURE 1 is a perspective view showing the cooperating buckle elements of a pair of safety belt segments provided with an ignition control switch for use in a safety system according to the present invention.

Referring to the drawings, and more particularly to FIGURE 6, a motor vehicle ignition circuit is illustrated which includes a conventional distributor assembly, designated generally at 11, associated with an ignition coil 12 and the motor vehicle battery 13. The coil 12 has the battery terminal 14, connected to the ungrounded pole of battery 13 through a wire 15 and the ignition switch 16. The coil 12 also has the distributor terminal 17 which is normally connected to the distributor assembly terminal 18, which in turn is connected to ground through the distributor breaker points 19 and 20, the pivoted breaker point 19 being intermittently rocked by the distributor cam 21. A condenser 22 is connected in a conventional manner between the terminal 18 and ground. The distributor rotor 23 is connected through a conductor 24 to the high tension terminal 25 of the coil 12, providing high tension discharge to the vehicle spark plugs through the distributor spark plug terminals 26.

In accordance with the present invention, the ground return terminal 17 of the ignition coil 12 is connected to the breaker point terminal 18 of the distributor 11 through a safety switch assembly 27 controlled by the cooperating buckle segments of at least one set of the motor vehicle safety belt members 28 and 29. Thus, in the specific embodiment of the invention illustrated herein, the motor vehicle is provided with the belt segments 28 and 29 at the vehicle operator's position, namely, at the driver's seat 30. The respective flexible belt segments 28 and 29 are thus secured to the vehicle floor at 31 and 32 and extend upwardly between the seat and its backrest in positions to fasten the vehicle operator to the seat when the cooperating buckle elements 33 and 34 of the belt segments are interlocked.

The belt segments 33 and 34 are of generally conventional construction insofar as their cooperating locking structure is concerned, and are constructed generally in accordance with the manner disclosed in U.S. Patent 2,458,810. Thus, the buckle segment 33, connected to the belt segment 28 is provided with a body including a forwardly projecting slotted plate-like tongue 36, having the longitudinal slot 37, and the buckle segment 34, attached to the belt segment 29 is provided with a slot to receive the tongue 36 and has mounted therein a locking arm 38 lockingly engageable with the slot 37, whereby the buckle segments 33 and 34 may be locked together by inserting the tongue 36 in a receiving slot provided therefor in the front portion of the buckle segment 34. The segment 34 is provided with a pivoted release arm 39 which retracts the latching portion of the member 38 from the slot 37 when the arm 39 is rotated away from the belt segment 29, namely, is rotated in a counterclockwise direction, as viewed in FIGURES 1 and 2.

Figure 2:
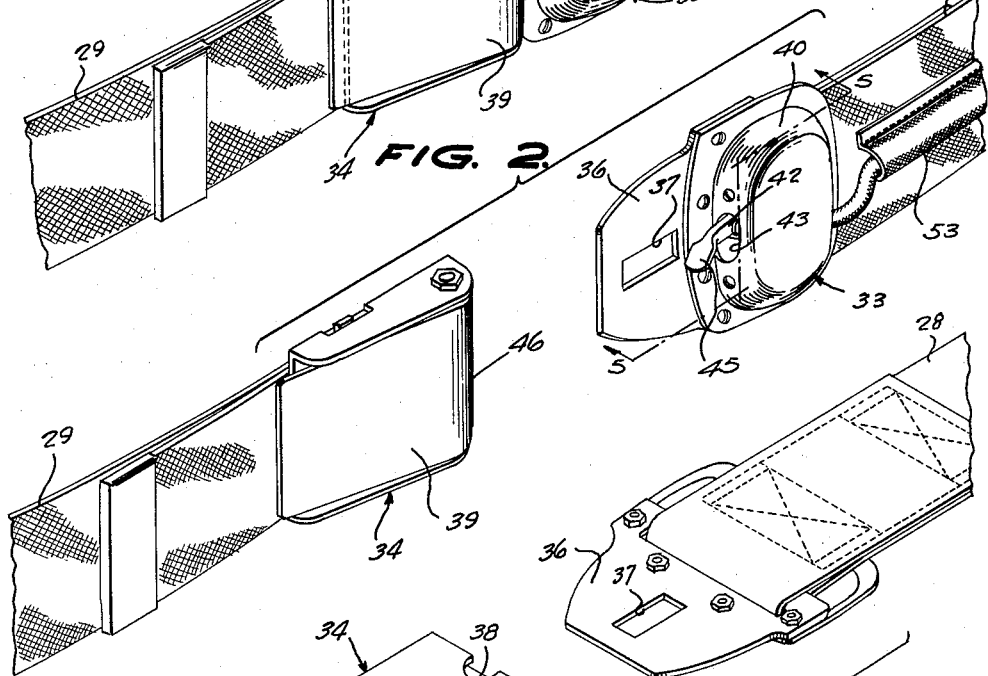
FIGURE 2 is a perspective view showing the belt segments of FIGURE 1 in separated positions.
Figure 3:
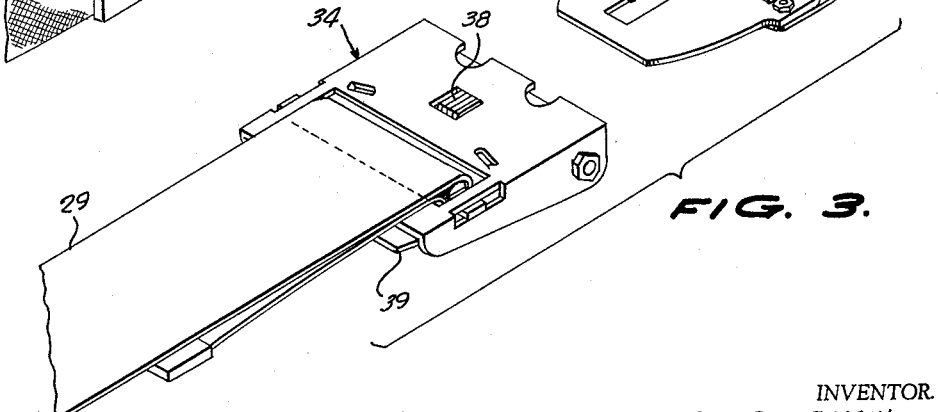
FIGURE 3 is a perspective view with the segments inverted of the structure illustrated in FIGURE 2.

In accordance with the present invention, the buckle segment 33 is formed with a housing 40 in which is mounted a micro-switch 41, as shown in FIGURE 5, the switch 41 being normally open, and having a pivoted operating arm 42 which projects through an aperture 43 provided in the peripheral wall of housing 40, the arm 42 being biased in a counterclockwise direction, as viewed in FIGURE 5, by a biasing spring 44. Thus, the spring 44 urges the arm 42 outwardly to a position wherein its enlarged outer end 45 is engageable with the front end portion 46 of the arm 39 when the buckle segments 33 and 34 are interengaged, as shown in FIGURE 1, whereby the arm 42 is rotated in a counterclockwise direction from the position shown in FIGURE 5 to a position wherein the micro-switch 41 is closed. Therefore, the switch 27 becomes closed only when the belt buckle segments 33 and 34 are properly interengaged in interlocking relationship, namely, when the buckle members are connected in the manner shown in FIGURE 1.

The respective terminals of the switch 27 are connected by insulated conductors 50 and 51 to the distributor terminal 18 and the ignition coil terminal 17, the wires 50 and 51 being housed in a sleeve member 53 stitched to the belt segment 28 and being substantially coextensive in length therewith, the sleeve 53 being of flexible material so that it flexes along with the flexible belt segment 28.

As will be readily apparent, the motor vehicle ignition circuit cannot be energized unless the vehicle operator properly fastens his seat belt, since the ignition circuit will remain open at the switch 27 until the buckle members 34 and 33 are lockingly interengaged. Therefore, it is not possible to start the vehicle until the operator properly fastens his seat belt, which closes the switch 27 and subsequently allows the ignition circuit to be energized by the closure of the conventional ignition switch 16.

The device of the present invention insures that the occupant of the front seat of the vehicle, namely, the operator, properly secures himself with his seat belt before operating the vehicle.

It will be noted that with the switch 27 open the terminal 17 of the ignition coil 12 is disconnected from the terminal 18 of the distributor and that it is impossible to complete the low tension circuit of the ignition coil under these conditions.

While a specific embodiment of an improved motor vehicle safety system for insuring the use of a seat belt of the vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle, a safety system comprising a pair of flexible seat belt segments secured to the vehicle adjacent the operator's seat thereof and having interlocking rigid buckle members for securing the seat belt segments around an occupant of the seat, one buckle member being provided with a housing having a front wall provided with an aperture, the other buckle member having a rigid front end portion located closely adjacent to said front wall when the buckle members are connected together, a normally open switch mounted in said housing and provided with a pivoted operating arm having its free end portion projecting through aperture in a position to engage with and be rotated inwardly by said rigid front end portion of the other buckle member when said buckle members are interlocked, said switch being closed responsive to inward rotation of said operating arm, said vehicle having an ignition energizing circuit, and a pair of flexible conductors mounted on the seat belt segment carrying said one buckle member and connecting said switch into said ignition energizing circuit, whereby said energizing circuit cannot be closed unless the switch is closed.

References Cited by the Examiner

UNITED STATES PATENTS

| | | |
|---|---|---|
| 2,802,073 | 8/57 | Simon. |
| 2,880,789 | 4/59 | Leibinger _____ 180—82 |
| 2,996,587 | 8/61 | McCarthy. |

A. HARRY LEVY, *Primary Examiner.*